(12) United States Patent
Tai et al.

(10) Patent No.: US 6,334,761 B1
(45) Date of Patent: Jan. 1, 2002

(54) CHECK-VALVED SILICON DIAPHRAGM PUMP AND METHOD OF FABRICATING THE SAME

(75) Inventors: Yu-Chong Tai; Ellis Meng, both of Pasadena; Xuan-Qi Wang, Los Angeles; Charles Grosjean, Pasadena, all of CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 09/517,226

(22) Filed: Mar. 2, 2000

(51) Int. Cl.$^7$ .............................. F04B 17/00; F16R 15/14
(52) U.S. Cl. ...................... 417/413.3; 417/566; 137/852; 137/859
(58) Field of Search .............................. 417/413.1, 413.3, 417/566, 571; 137/852, 859; 251/369

(56) References Cited

U.S. PATENT DOCUMENTS

| | | | | |
|---|---|---|---|---|
| 3,819,305 A | * | 6/1974 | Klochemann et al. ........ | 417/413 |
| 4,487,662 A | * | 12/1984 | Fischbeck ........................ | 204/15 |
| 4,712,583 A | * | 12/1987 | Pelmulder et al. ............ | 137/852 |
| 5,380,396 A | * | 1/1995 | Shikida et al. ................ | 156/630 |
| 6,082,979 A | * | 7/2000 | Friedman ........................ | 417/566 |

* cited by examiner

*Primary Examiner*—Charles G. Freay
(74) *Attorney, Agent, or Firm*—Daniel L. Dawes, Esq.; Myers, Dawes & Andras LLP

(57) ABSTRACT

A silicone rubber diaphragm pump utilizing a pair of MEMS Parylene check valves and a miniature solenoid plunger and actuator is comprised of a spacer sandwiched by a silicone rubber diaphragm on one side and a check valve support on the other. The check valves in the check valve support form the inlet and outlet to a pumping chamber defined between the check valve support and silicone rubber diaphragm. The pumping action has been demonstrated by driving the silicone diaphragm with the plunger using the solenoid type actuator to generate over and under pressures in the chamber. This forces the pumped medium into and out of the chamber, thus allowing the medium to be transported. Tubing or connectors affixed to the inlet and outlet ports of the check valve support structure allow for external fluidic access. The pump works with both gas and liquid.

12 Claims, 6 Drawing Sheets

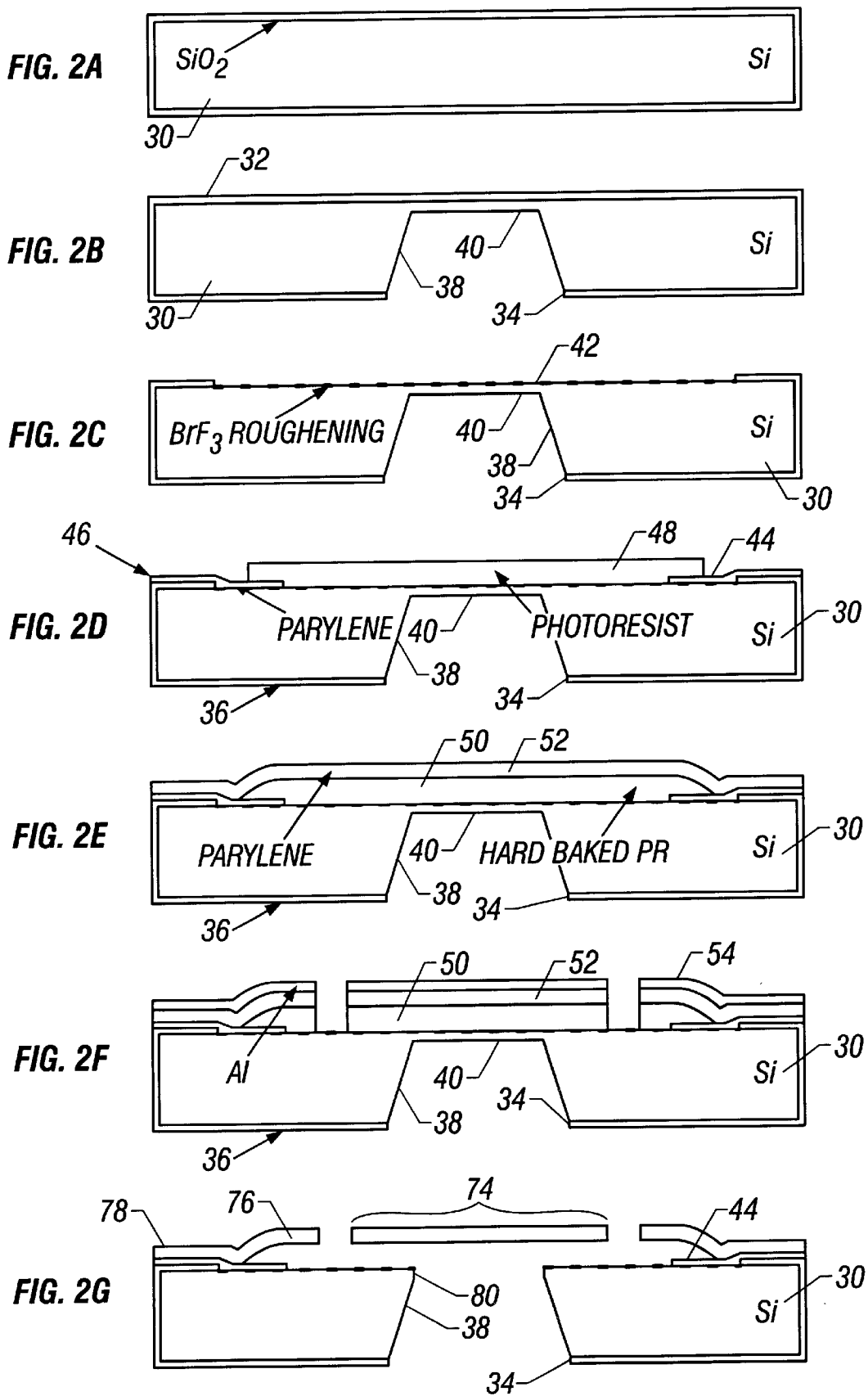

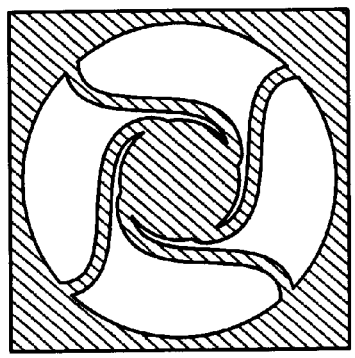
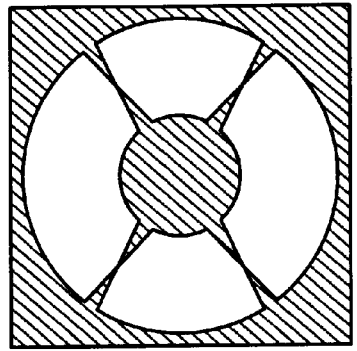
*FIG. 3A-1*   *FIG. 3A-2*
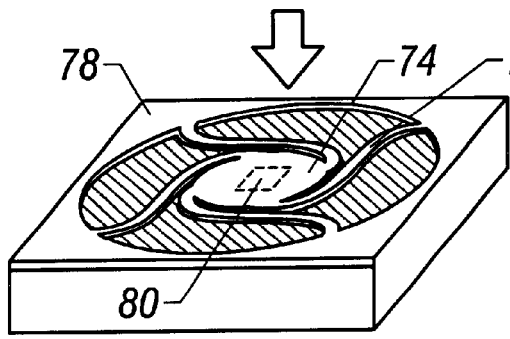
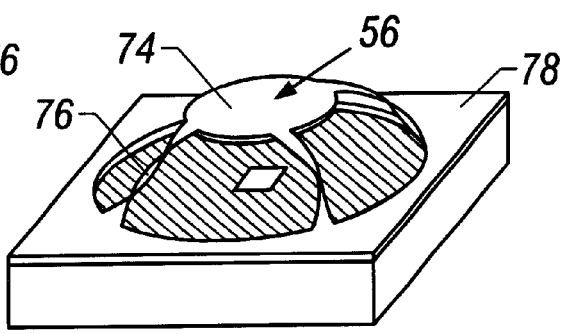
*FIG. 3B-1*   *FIG. 3B-2*
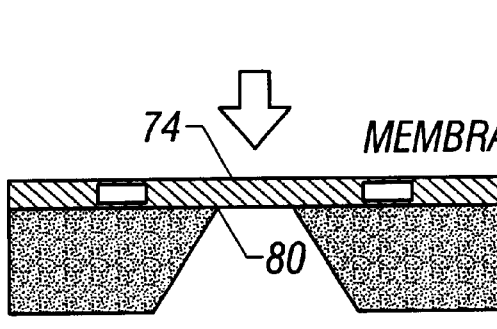
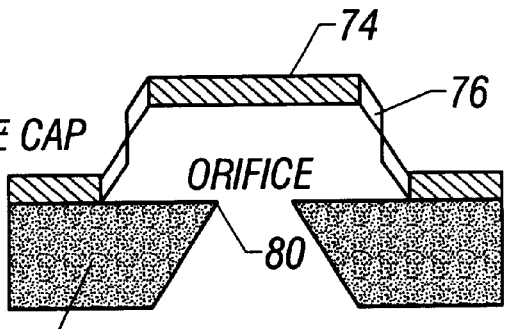
*FIG. 3C-1*   *FIG. 3C-2*

CHECK-VALVED SILICON DIAPHRAGM PUMP AND METHOD OF FABRICATING THE SAME

RELATED APPLICATIONS

The present application is related to copending U.S. Provisional application Ser. No. 60/123,697, filed on Mar. 8, 1999.

This invention was made with Government support under DARPA Grant No. N66001-96-C-8632. The Government has certain rights in this invention.

BACKGROUND OF THE INVENTION

FIELD OF THE INVENTION

The invention relates to the field of silicon micromachined devices and in particular mems pumps.

BRIEF SUMMARY OF THE INVENTION

The invention is an apparatus which is comprised of a micromachined substrate having an orifice defined therethrough, and a micromachined elastic valve structure disposed over the orifice and coupled to the substrate. The valve structure and substrate act in combination as a passive check valve for the flow of fluid through the orifice. Silicon micromachined elements are contemplated, but micromachining of other materials can also be practiced. The term silicon micromachining therefore need not involve the machining of silicon or a semiconductor, but generally refers to mems or microelectromachining techniques.

The apparatus further comprises a housing in which the micromachined substrate and micromachined elastic valve structure are disposed. The housing defines a pumping chamber with which the check valve is communicated. In an operating pump there are two check valves disposed within the housing. One of the two check valves is communicated with the pumping chamber to allow flow to the pumping chamber and the other of the two check valves is communicated with the pumping chamber to allow flow from the pumping chamber. An elastic membrane is communicated with the pumping chamber to transmit pressure variations into the chamber to activate the check valve(s). A plunger is directly or fluidically indirectly coupled to the elastic membrane to transmit force to the elastic membrane to create the pressure variations into the chamber to activate the check valve(s). An actuator is coupled to the plunger to move the plunger thereby ultimately causing the pressure variations into the chamber to activate the check valve so that in combination a pump is provided.

In the illustrated embodiment the micromachined elastic valve structure is comprised of Parylene C and the elastic membrane is comprised of silicone rubber. The micromachined elastic valve structure is comprised of an integral elastic layer in which a valve cap and a plurality of extendable tethers are defined. The valve cap is positioned and sized to seal the orifice defined through the substrate when the valve cap is passively forced by fluid pressure toward the orifice, and to open the orifice when the valve cap is passively forced by fluid pressure away from the orifice. While in the illustrated embodiment, passive valve elements are contemplated it is within the scope of the invention that the valve elements may be active, namely may have disposed in or on them devices which cause the valve elements themselves to move toward or away from the orifice, such as electromagnetic or electrostaticly driven microactuators.

The housing is micromachined, but may include portions which are conventionally machined in combination with the micromachined check valve(s). In the illustrated embodiment the housing comprises a valve support and a spacer between which the micromachined elastic valve structure is disposed. The detailed design of the housing may be varied in both form and substance in a wide variety of ways while still providing the same functional results of supporting the check valve(s) in relation to a pumping chamber and inlet/outlet orifices.

The invention is also a method comprising the steps of defining a support membrane and underlying chamber in a substrate. A first patterned elastic layer is disposed on the substrate. A sacrificial layer is disposed over the support membrane. A second patterned elastic layer is disposed on the sacrificial layer and on the first patterned elastic layer. The support membrane and sacrificial layer is removed to release the first and second patterned elastic layer and to define an orifice through the substrate in communication with the chamber. As a result, a structure is formed in which the first and second patterned elastic layer function as a passive check valve for fluid flow through the orifice.

The method further comprises providing a diaphragm and coupling the diaphragm to the substrate so that the diaphragm forms at least a portion of a wall defining the chamber. A housing is provided in which the check valve is disposed and which defines an inlet/outlet orifice through the housing communicating through the check valve with the chamber. A plunger is coupled to the diaphragm and an actuator coupled to the plunger wherein the diaphragm is moved to create pressure variations within the chamber. Providing two opposing directed check valves results in a pump, while a single check valve is usable as a microhydraulic actuator.

The illustrated embodiment of the invention having now been briefly summarized turn to the following drawings where one embodiment of the invention can be visualized and where like elements are reference by like numerals.

BRIEF DESCRIPTION OF THE DRAWINGS

FIGS. 2a–2g are side cross-sectional views illustrating the steps by which a check valve is fabricated according to the invention.

FIGS. 3a-1 and 3a-2 are top plan views of valve 12 in which valve 12 is closed and opened respectively.

FIGS. 3b-1 and 3b-2 are perspective depictions of valve 12 in which valve 12 is closed and opened respectively.

FIGS. 3c-1 and 3c-2 are side cross-sectional views of valve 12 in which valve 12 is closed and opened respectively.

The invention and its various embodiments can be understood by now turning the following detailed description of the preferred embodiments.

DETAILED DESCRIPTION OF THE PREFERRED EMBODIMENTS

Figure 1:
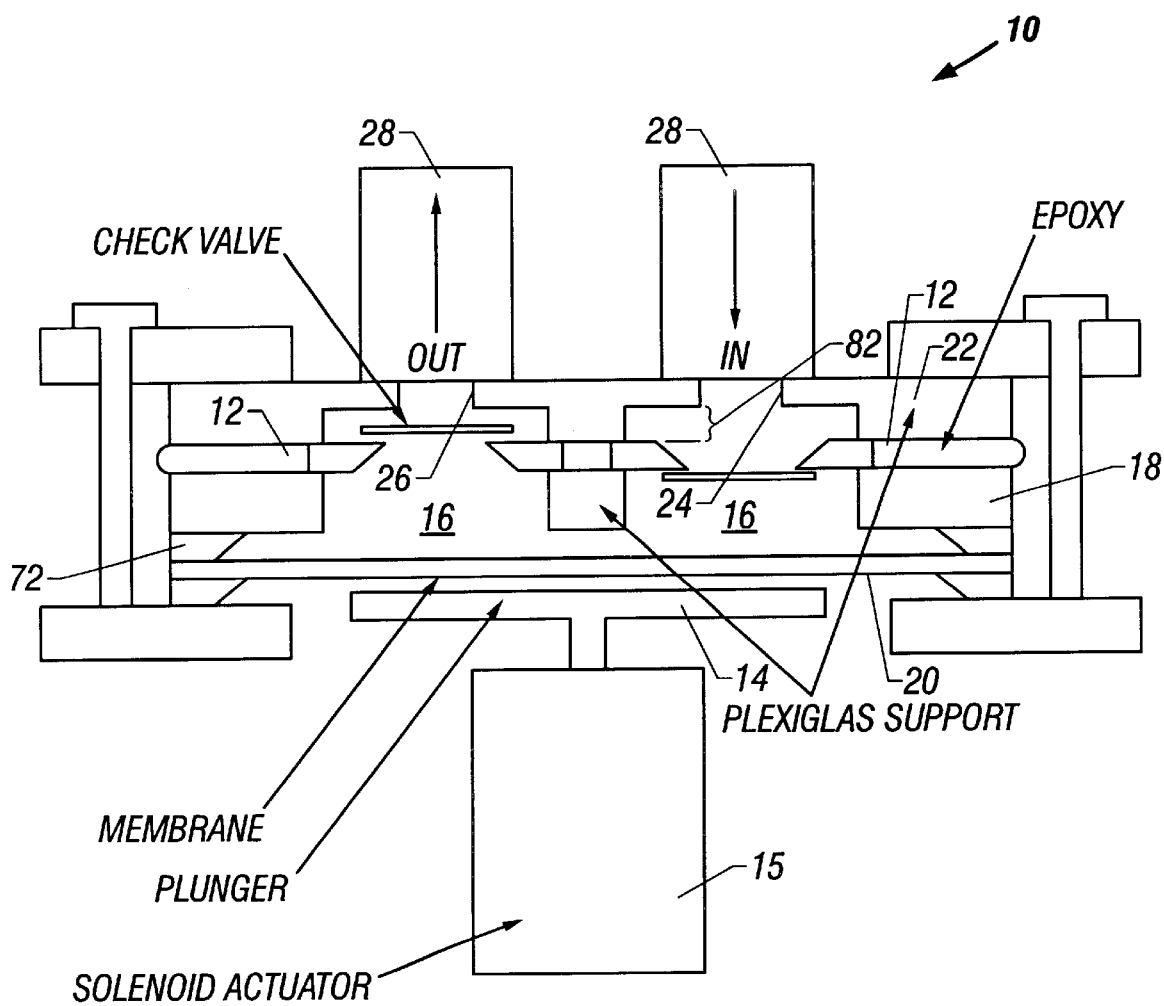
FIG. 1 is a diagrammatic side cross-sectional view of an assembled pump fabricated according to the invention.
Figure 5A:
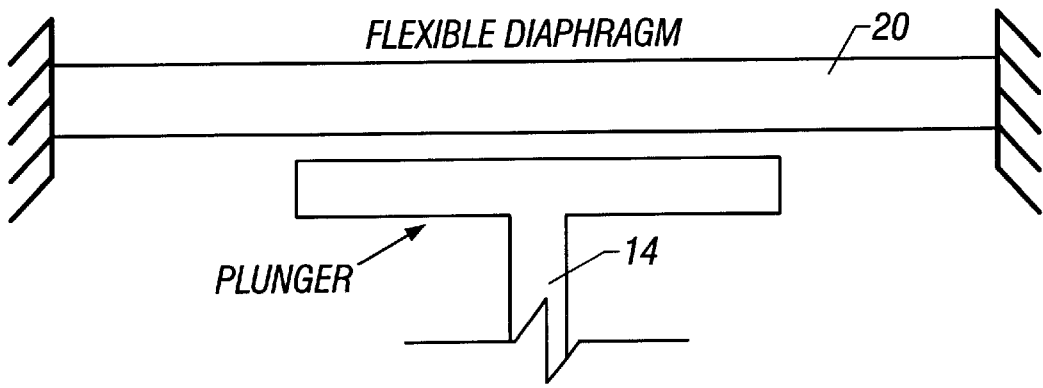
FIGS. 5a and 5b are schematic side cross-sectional views of the coupling between the plunger and diaphragm.
Figure 5B:
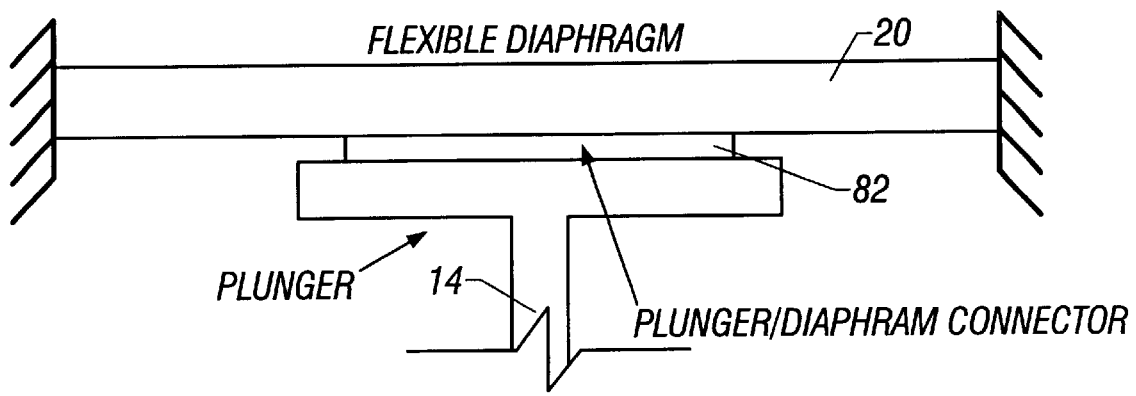

A silicone rubber diaphragm pump, generally denoted in FIG. 1 by reference numeral 10, utilizing a pair of MEMS Parylene check valves 12 and a miniature solenoid plunger actuator 14 diagrammatically shown in FIGS. 1, 5a and 5b has been developed and tested as shown in the cross-sectional side view of FIG. 1. The pumping chamber 16 shown in FIG. 1 is comprised of a spacer 18 sandwiched by a silicone rubber diaphragm 20 on one side and a check valve support 22 on the other. The check valves 12 in the check valve support 22 form the inlet 24 and outlet 26 to the pumping chamber 16. The pumping action is achieved by driving the silicone diaphragm 20 with a plunger 14 using a solenoid type actuator 15 to generate over and under pressures in the pumping chamber 16. This forces the pumped medium into and out of the chamber 16, thus allowing the medium to be transported. Tubing or connectors 28 affixed to the inlet and outlet ports 24 and 26 of the check valve support structure 22 allow for external access. This pump 10 is designed to work with both gas and liquid, which are collectively termed, a "fluid".

Fabrication

The various elements of the pump 10 are fabricated using both micromachining and conventional machining techniques. Parts specifically requiring micromachining technology are the check valves 12 and silicone rubber membrane 20. The fabrication of spacer 18 and check valve support structure 22 is amenable to either micromachining and conventional machining techniques. The following description of the fabrication process will describe the manufacture of a single valve 12, but it is to be expressly understood that a multiplicity of valves 12 are fabricated in a single wafer at the same time. In addition, valves 12 need not be all fabricated as single valve units, but made fabricated as groups of valves with different orientations, namely one valve oriented to permit upward flow and a second valve in the same die oriented to permit downward flow.

Three separate processes are required to fabricate the Parylene check valves 12, silicone rubber membrane 20, and spacer 18, all of which use silicon as a substrate material. To begin the check valve process as shown diagrammatically in FIG. 2a, thermal oxidation is performed to envelop the substrate or wafer 30 in a 1–2 micron thick layer of silicon dioxide layer 32. This layer 32 is selectively patterned using photolithography to expose windows 34 of silicon dioxide on the back side 36 of the wafer 30 to a buffered hydrofluoric acid (BHF) etch.

Once the silicon dioxide is removed, the wafer 30 is immersed in a heated potassium hydroxide (KOH) bath as shown in FIG. 2b in which the silicon areas no longer masked by silicon dioxide are etched away forming cavity 38 until a thin silicon membrane 40, approximately 20–30 microns thick, remains. The front side oxide 42 is patterned and removed, allowing for selective surface roughening with conventional BrF3 gas phase etching as shown in FIG. 2c. A-174 adhesion promoter as manufactured by Specialty Coating Systems Inc. of Alpha Metals Inc. is applied prior to the deposition of a 2 μm thick layer of Parylene-C layer 44 (poly-mono-chloro-para-xylylene) on the front side 46. After patterning and oxygen plasma etching the first Parylene layer 44, a sacrificial photoresist layer 48 is spun on and patterned as shown in FIG. 2d. Hard baking at approximately 120° C. smoothes the sharp edges in photoresist layer 48 produced by the patterning step. A second layer of Parylene 50 is deposited as shown in FIG. 2e without applying adhesion promoter and masked with a 0.1 micron thick thermally evaporated aluminum layer 52 as shown in FIG. 2f.

Definition of the final check valve geometry is achieved by patterning and etching this second Parylene layer 50 as shown in FIG. 2f. Photoresist 54 is applied to both sides of the fabricated wafer 30 and patterned to unmask the thin silicon membrane 40 left over from the KOH etch. To expose the sacrificial photoresist 48, membrane 40 is then removed by BrF3 etching. Wafer dicing isolates the individual check valve structures. Finally, the check valves structure 44, 50 as shown in FIG. 2g is released by stripping the protective photoresist layer 48, chemically removing the aluminum masking layer 54, and dissolving away the sacrificial photoresist layer 48 to obtain the Parylene valve structure 44, 50 shown in FIG. 3, collectively denoted by reference numeral 12.

FIGS. 3a and 3a' are top plan views of valve 12 in which valve 12 is closed and opened respectively. FIGS. 3b and 3b' are perspective depictions of valve 12 in which valve 12 is closed and opened respectively. FIGS. 3c and 3c' are side cross-sectional views of valve 12 in which valve 12 is closed and opened respectively. Valve 12 is organized such that there is a central sealing portion or cap 74 and a plurality of curved tethers 76 integrally connecting central sealing portion 74 to the remaining peripheral portion 78 which is attached to substrate 30. As shown in FIG. 2g when membrane 40 is removed a valve orifice 80 is defined. Central sealing portion 74 is sized so that it completely and amply covers and seals orifice 80 when pressed downwardly against it as shown in FIG. 3c. In the open position shown in FIG. 3c', tethers 76 twist to allow central sealing portion 74 to move away from orifice 80 thereby opening it fully.

Figure 4A:
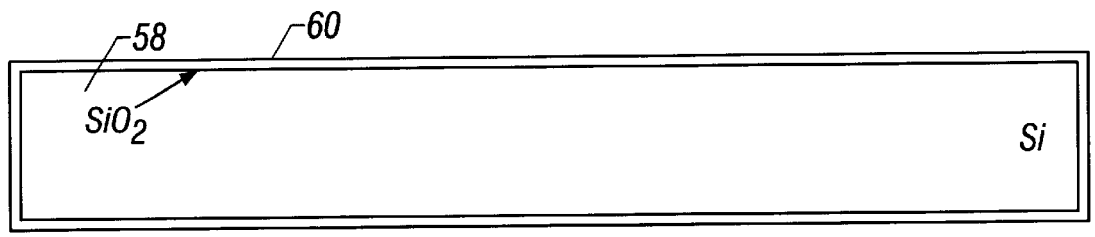
FIGS. 4a–4d are side cross-sectional views of the process steps by which the diaphragm used in the invention is fabricated.
Figure 4B:
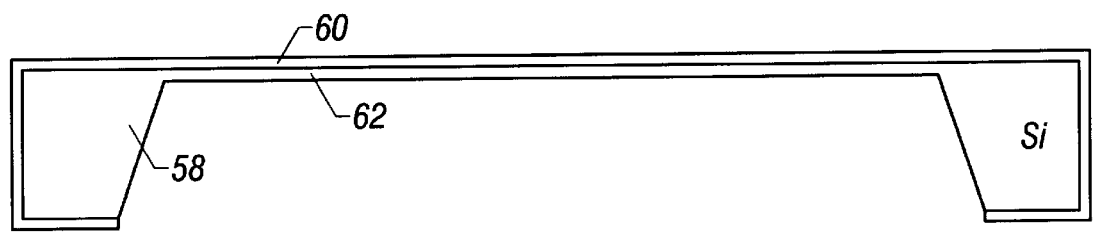
Figure 4C:
Figure 4D:
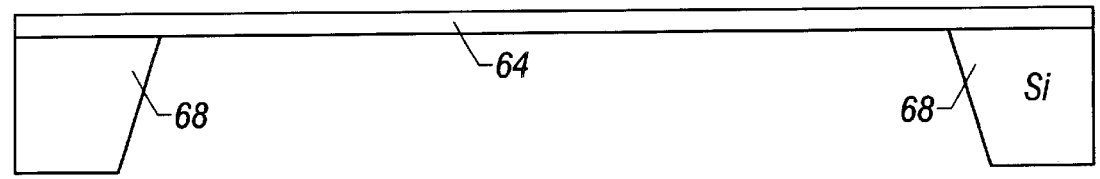

The silicone rubber diaphragm process is depicted in FIGS. 4a–4d. Wafer 58 is masked with a silicon dioxide layer 60 as shown in FIG. 4a is etched in KOH to form a thin silicon membrane 62 shown in FIG. 4b. After removing the oxide layer 60 with BHF, silicone rubber layer 64 is spin coated to produce an 80 μm thick layer on top of the polished silicon surface 66. Depending on the application/pumping medium used, it may be necessary to deposit a layer of Parylene on the silicone rubber layer 64 to act as a vapor barrier. The silicone rubber layer or membrane 64 is then released by removing the thin silicon membrane 62 in a sulfur hexafluoride (SF6) plasma. Dicing the wafer 58 concludes the process to result in the silicone membrane with peripheral silicon supports 68 as shown in the top and bottom plan views of FIGS. 5a and 5b after a Plexiglas clamping frame 70 has been added.

A silicon spacer 72 as shown in FIG. 1 is created by completely etching through an oxide-masked silicon wafer (not shown) in a heated KOH bath. The oxide is removed and the wafer is diced. Material for the spacer is not restricted to silicon; Plexiglas, glass, and other polymers can also be used. Depending on what material is selected, fabrication of the spacer may be performed using conventional machining techniques.

Structural support for the check valves 12 and fluidic connections 28 to the device are realized using Plexiglas sheets. Glass, silicon, and other polymers are also possible structural materials. These plates are drilled through with holes that are larger than the combined diameter of the check valve cap and tethers. This ensures that the deflection of the check valve caps during pump operation are not obstructed by the silicone membrane or tubing walls at any time.

To facilitate attachment of tubing 28 or other connections, the top plate 22 may have a stepped down hole, providing for an offset 82 between inlet 24 and outlet 26, depending on the check valve sizes/layout as shown in the side cross-sectional view of FIG. 1. Part of the pumping chamber 16 is defined by attaching a spacer 18 to the side of the plate/check valve sandwich structure 22, 12 without tubing/connections. The completed chamber is formed by clamping or gluing the sandwich/spacer stack 22, 12, 18 to the silicone rubber membrane 20. By properly situating the plunger 14 of the solenoid actuator beneath the silicone membrane 20 as depicted in FIGS. 5a and 5b, a pump 10 is realized.

Design

Desirable characteristics of a check valve 12 include low cracking pressures, low reverse leakage and low flow resistance. Parylene check valve 12 satisfies these requirements with the additional advantage of negligible stiction and surface tension effects. The relatively low Young's modulus of Parylene 44, 50 (~2.8 GPa) and large deflection of the tethered Parylene structure 12 combine to produce low flow resistance and aid in improving overall pump efficiency. Other check designs for valve cap 74 and tethers 76 that satisfy these requirements may also be used in addition to the configuration shown above.

It has been shown that flow resistance in the illustrated check valve 12 is primarily due to the orifice 80 produced by KOH etching instead of the valve cap 74. Thus, for the best performance, it is desirable to use the largest diameter check valve 12 allowable given the size of silicone diaphragm 20 or the existing design constraints.

Alternatively, it is also possible to use two or more check valves 12 in the inlet and outlet positions 24 and 26 to reduce flow resistance. Although the procedure previously described details a one-sided check valve design in FIG. 1, to simplify assembly, a double-sided process performed on a double-side polished silicon wafer can integrate both inlet and outlet check valves 12 on one die. This eliminates manual alignment of the valves to the supports and great reduces assembly time.

Silicone rubber has a low Young's modulus and has been implemented in microvalves due to its high elongation (100%–1000%) and thus, large achievable deflections. For these advantages, a MEMS silicone rubber membrane is also used in this diaphragm pump 10. While the illustrated embodiment describes a separated silicone diaphragm and plunger, it is also possible to force the diaphragm to exactly follow plunger movements. Instead of completely removing the silicon below the membrane or diaphragm 20 as shown in FIG. 5a, it is possible to leave a silicon island 82 as shown in FIG. 5b, thus creating a bossed structure. Silicon island 82 can then be glued to the plunger 14. Depending on the type of silicone used, it may be possible to simply glue the plunger 14 directly to the membrane 20. FIGS. 5a and 5b show side cross-sectional views of a generalized schematic of both the unattached and attached versions.

To achieve better compression ratio, plunger and diaphragm shapes can be optimized to achieve better pumping performance. For instance, pumping chambers 16 with circular geometries may perform better than rectangular ones.

Figure 6:
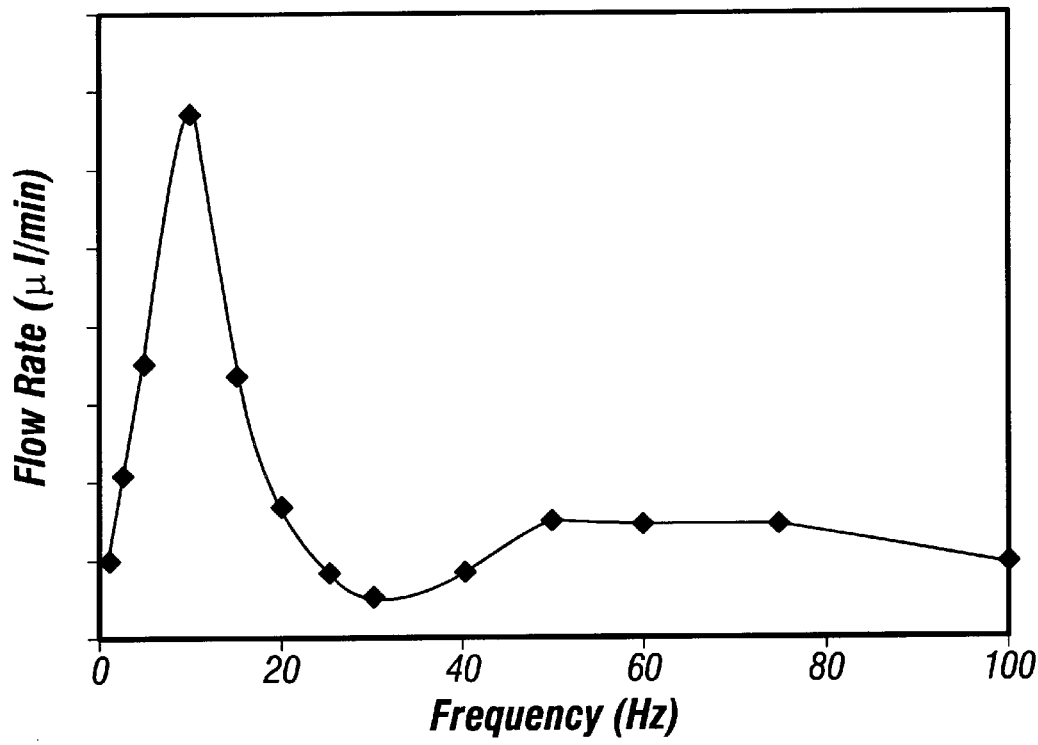
FIG. 6 is a graph of the flow rate of a pump devised according to the invention as a function of frequency.
Figure 7:
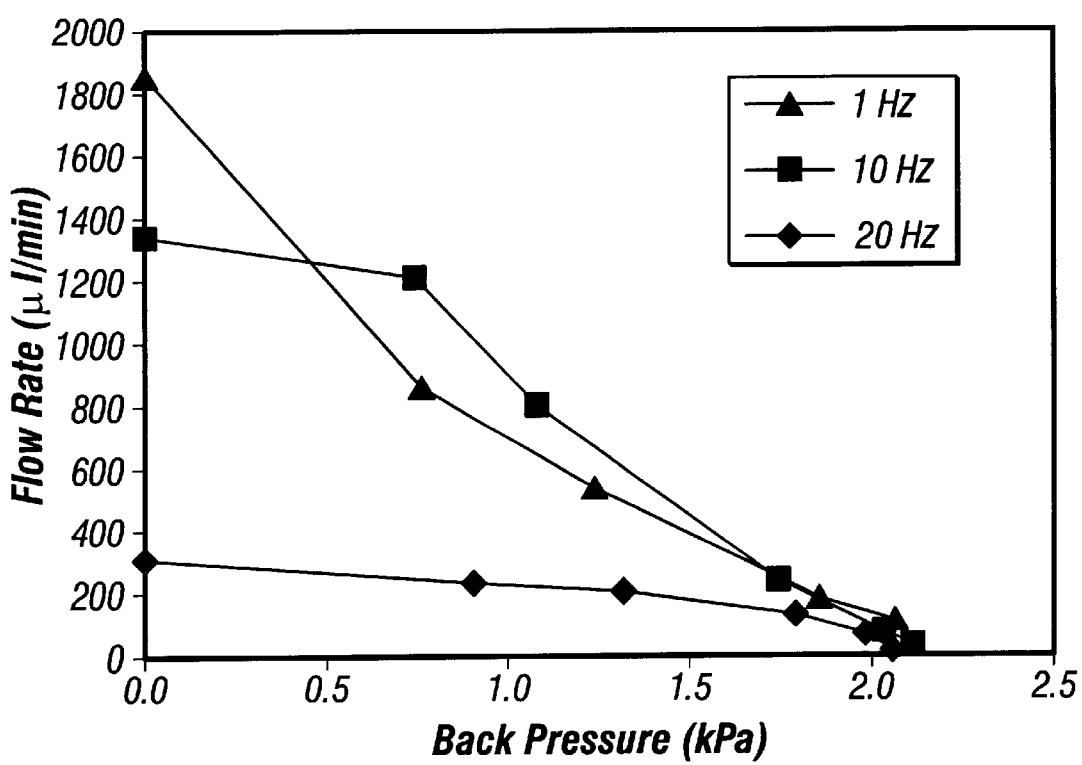
FIG. 7 is a graph of the flow rate of a pump devised according to the invention as a function of back pressure at the pumping frequencies of 1, 10 and 20 Hz.

In the illustrated embodiment of pump 10, operating frequencies from 0 up to 100 Hz are demonstrated with a maximum flow rate of 3379 $\mu$l/min for water at 10 Hz and 700 mW. FIG. 6 is a graph of flow as a function of frequency of drive of plunger 14 in which micromachined pumping chamber 16 is comprised of two passive Parylene check valves 12 which are 1500 $\mu$m in diameter and a 7×7 mm2 silicone rubber membrane. The supports are made of conventionally machined Plexiglas and the spacer is micromachined. When subjected to back pressure, typical flow rate behavior is shown in the graph of FIG. 7, which shows flow rate as a function of back pressure in the same valve at different pumping frequencies.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. An apparatus comprising:
   a micromachined substrate having an orifice defined therethrough; and
   a micromachined elastic valve structure disposed over said orifice and coupled to said substrate, said valve structure and substrate in combination acting as a passive check valve for the flow of fluid through said orifice, wherein said micromachined elastic valve structure is comprised of Parylene.

2. The apparatus of claim 1 further comprising:
   a housing in which said micromachined substrate and micromachined elastic valve structure are disposed, said housing defining a pumping chamber with which said check valve is communicated;
   two of said check valves disposed within said housing, one of said two check valves being communicated with said pumping chamber to allow flow to said pumping chamber and the other of said two check valves being communicated with said pumping chamber to allow flow from said pumping chamber.

3. The apparatus of claim 2 further comprising an elastic membrane communicated with said pumping chamber to transmit pressure variations into said chamber to activate said check valve.

4. The apparatus of claim 3 further comprising a plunger coupled to said elastic membrane to transmit force to said elastic membrane to create said pressure variations into said chamber to activate said check valve.

5. The apparatus of claim 4 further comprising an actuator coupled to said plunger to move said plunger thereby ultimately causing said pressure variations into said chamber to activate said check valve so that in combination a pump is provided.

6. The apparatus of claim 4 wherein said plunger is mechanically coupled to said membrane.

7. An apparatus comprising:
   a micromachined substrate having an orifice defined therethrough; and
   a micromachined elastic valve structure disposed over said orifice and coupled to said substrate, said valve structure and substrate in combination acting as a passive check valve for the flow of fluid through said orifice;
   a housing in which said micromachined substrate and micromachined elastic valve structure are disposed, said housing defining a pumping chamber with which said check valve is communicated; and
   an elastic membrane communicated with said pumping chamber to transmit pressure variations into said chamber to activate said check valve wherein said elastic membrane is comprised of silicone rubber.

8. The apparatus of claim 7 wherein said housing is micromachined.

9. The apparatus of claim 7 wherein said housing is conventionally machined.

10. The apparatus of claim 7 wherein said housing comprises a valve support and a spacer between which said micromachined elastic valve structure is disposed, said valve support being disposed adjacent to said micromachined substrate, and said support being disposed proximal to said elastic membrane.

11. An apparatus comprising:
   a micromachined substrate having an orifice defined therethrough; and
   a micromachined elastic valve structure disposed over said orifice and coupled to said substrate, said valve structure and substrate in combination acting as a passive check valve for the flow of fluid through said orifice;
   a housing in which said micromachined substrate and micromachined elastic valve structure are disposed, said housing defining a pumping chamber with which said check valve is communicated;
   wherein two of said check valves are disposed within said housing, one of said two check valves being communicated with said pumping chamber to allow flow to said pumping chamber and the other of said two check valves being communicated with said pumping chamber to allow flow from said pumping chamber; and
   an elastic membrane communicated with said pumping chamber to transmit pressure variations into said chamber to activate said two check valves, wherein said elastic membrane is comprised of silicone rubber.

12. An apparatus comprising:
   a micromachined substrate having an orifice defined therethrough; and
   a micromachined elastic valve structure disposed over said orifice and coupled to said substrate, said valve structure and substrate in combination acting as a passive check valve for the flow of fluid through said orifice, wherein said micromachined elastic valve structure is comprised of an integral elastic layer in which a valve cap and a plurality of extendable tethers are defined, said valve cap positioned and sized to seal said orifice when passively force by fluid pressure toward said orifice, and to open said orifice when passively force by fluid pressure away from said orifice.

* * * * *